Patented Apr. 27, 1954

2,676,984

UNITED STATES PATENT OFFICE 2,676,984

PREPARATION OF GUANIDINE FROM
AMMONIUM THIOCYANATE

Nat H. Marsh, Noroton Heights, Conn., assignor
to American Cyanamid Company, New York,
N. Y., a corporation of Maine No Drawing. Application May 15, 1951,
Serial No. 226,553

4 Claims. (Cl. 260—564)

The present invention relates to the reaction of ammonium thiocyanate with sulfur dioxide and ammonia to give a reaction mass containing a guanidine sulfate.

It is an object of the invention to heat together ammonium thiocyanate, ammonia, and sulfur dioxide under superatmospheric pressure to give a reaction mass containing guanidine sulfate.

Additional objects will be apparent from the discussion hereinafter.

It is well known that ammonium thiocyanate may be heated alone to form a guanidine salt in the form of thiocyanate. The inventive point of the instant application is that if ammonia and sulfur dioxide are added to the ammonium thiocyanate, the yield of guanidine salt is greater than that producible from ammonium thiocyanate alone.

It is believed that the overall reaction proceeds according to the following equation:

$2NH_4SCN + 4SO_2 + 4NH_3 \longrightarrow$

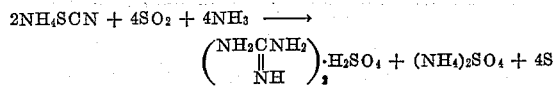

Thiourea can, of course, be used in place of ammonium thiocyanate in the reactions herein disclosed since these two compounds are in dynamic equilibrium with each other at the reaction temperatures used.

The reaction proceeds within the temperature range of approximately 180° to 310° C. and within the pressure range of 50 to 5000 p. s. i., and even higher. The preferred temperature is 190° to 230° C. and the preferred pressure is 150 to 450 p. s. i. The three reactants can be employed in virtually any ratio, but it is preferred that the ammonia and sulfur dioxide be present in a stoichiometric excess over the ammonium thiocyanate. If ammonium thiocyanate, ammonia, and sulfur dioxide are heated in the respective mol ratios of 1–100:1–100:1–100, some guanidine sulfate will be formed, and the amount of guanidine sulfate so formed will be greater than that obtainable by heating the corresponding amount of ammonium thiocyanate alone. Preferably, however, the ammonia and sulfur dioxide are in a molar excess over the ammonium thiocyanate.

The following examples are representative of preferred modes of conducting the process of the invention.

Example 1

Into a 300-cc. autoclave equipped with stirrer is charged 0.6 mol of ammonium thiocyanate, 1.29 mols of ammonia, and 1.20 mols of sulfur dioxide. The autoclave is then sealed and heated with stirring at a temperature of 190° C. for 12 hours under the autogenously produced pressure. At the end of this time the autoclave is vented, opened, and guanidine sulfate recovered from the reaction mass by leaching the mass with water and precipitating the guanidine sulfate by means of the addition of acetone or the like, which renders the guanidine salt relatively insoluble. The conversion of ammonium thiocyanate to guanidine sulfate is 52.8%.

Example 2

The yield is somewhat improved if the ammonia and sulfur dioxide are present in excess over the theoretical requirements set forth in the equation supra. In this example 0.60 mol of ammonium thiocyanate, 1.82 mols of ammonia, and 1.80 mols of sulfur dioxide are heated together in a 300-cc. autoclave under the same conditions as in the preceding example, and guanidine sulfate is analogously recovered, with a conversion of ammonium thiocyanate to guanidine sulfate of 57.8%.

Example 3

If desired the ammonium thiocyanate reactant can be formed in situ as a transitory intermediate in the reaction by starting with carbon disulfide and ammonia, according to the following probable overall equation:

In accordance with this modification of the invention, 0.6 mol of carbon disulfide, 5.4 mols of ammonia, and 3.6 mols of sulfur dioxide are charged to a 590-cc. autoclave equipped with stirrer. The autoclave is sealed and heated with stirring for 3 hours at 210° C., and the product is then worked up as in the preceding examples. The yield of guanidine sulfate is equivalent to a 56% conversion of the carbon disulfide.

When using the modification of Example 3 the carbon disulfide:ammonia:sulfur dioxide mol ratio can vary widely, e. g., within the respective mol ratio range of 1–100:1–100:1–100. Preferably, however, the sulfur dioxide should be in molar excess over the carbon dioxide, and ammonia should be in molar excess over the sulfur dioxide for best results. For example, a $CS_2:NH_3:SO_2$ mol ratio of 1:6–9:4–6 is quite suitable.

The guanidine sulfate usually resulting from the process of the present invention is predominantly in the form of the diguanidine sulfate. Obviously, the more acidic monoguanidine sulfate may be readily prepared therefrom by acidifying an aqueous solution of the diguanidine sulfate with sulphuric acid. In general, at a pH of about 2 the salt is predominantly in the form of the monoguanidine sulfate, whereas at a pH of about 7 the sulfate is predominantly in the form of the diguanidine sulfate.

The isolation of the guanidine sulfate may be effected by any of the conventional means, such as by cooling or evaporating to cause crystallization, or by adding a water-miscible organic liquid, such as acetone, to decrease the solubility of the salt and cause its precipitation. Because of the appreciable solubility of the sulfate, the latter technique is usually resorted to, despite the cost of the acetone. The guanidine molecule being that desired, said guanidine values can also be isolated by forming a less soluble salt, such as a picrate, a carbonate, a nitrate, or a phosphate. The preparation of such less soluble salts is effected by simply adding an equivalent amount of the corresponding acid or metallic or ammonium salts of the corresponding acid to the aqueous solution of the sulfate, and inducing crystallization by any conventional means, such as those aforementioned.

The guanidine values may also be recovered as guanidine hydrate by dissolving the dry reaction mixture in an alcohol, such as ethanol, adding an excess of potassium hydroxide to precipitate the sulfate ion as potassium sulfate, and thus provide an alcoholic solution of the free base. Such guanidine hydrate may be isolated from solution, if desired, by conventional procedures, although generally some difficulty is experienced in applying the usual methods for inducing crystalization in the isolation of the guanidine.

The guanidine salts provided by the process of the present invention are valuable chemicals, being useful as fireproofing agents, in the preparation of resins and blueprint materials, such as intermediates in the preparation of chemotherapeutic agents, explosives, pharmaceuticals, surface-active agents, and the like.

The workable and preferred temperature and pressure ranges in the $CS_2$ modification of Example 2 are the same as when starting with ammonium thiocyanate.

While the invention has been described with particular reference to specific embodiments, it is to be understood that it is not to be limited thereto but is to be construed broadly and restricted solely by the scope of the appended claims.

I claim:

1. The improved method of converting ammonium thiocyanate to a reaction mass comprising a guanidine sulfate that comprises heating together ammonium thiocyanate, ammonia, and sulfur dioxide the ammonia and sulfur dioxide each being employed in molar excess over the ammonium thiocyanate at a temperature within the range 180° to 310° C. and under a pressure of at least 50 p. s. i.

2. The method according to claim 1 in which the ammonium thiocyanate:ammonia:$SO_2$ mol ratio is approximately 1:3:3.

3. The method according to claim 2 in which the temperature is within the approximate range 190° to 230° C.

4. The method according to claim 3 in which the pressure is within the approximate range 150 to 450 p. s. i.

References Cited in the file of this patent

UNITED STATES PATENTS

| Number | Name | Date |
|---|---|---|
| 2,524,054 | Hill | Oct. 3, 1950 |
| 2,567,955 | Marsh | Sept. 18, 1951 |

OTHER REFERENCES

Chemical Abstracts, vol. 5 (1911), p. 1880.